United States Patent
Trembley

(10) Patent No.: US 6,768,286 B2
(45) Date of Patent: Jul. 27, 2004

(54) BATTERY CHARGER SYSTEM AND METHOD FOR PROVIDING DETAILED BATTERY STATUS AND CHARGING METHOD INFORMATION ABOUT MULTIPLE BATTERIES

(75) Inventor: Matthew Glen Trembley, Grayson, GA (US)

(73) Assignee: LSI Logic Corporation, Milpitas, CA (US)

( * ) Notice: Subject to any disclaimer, the term of this patent is extended or adjusted under 35 U.S.C. 154(b) by 31 days.

(21) Appl. No.: 10/224,084

(22) Filed: Aug. 20, 2002

(65) Prior Publication Data

US 2004/0036445 A1 Feb. 26, 2004

(51) Int. Cl.[7] ................................................. H02J 7/00
(52) U.S. Cl. ....................... 320/117; 320/116; 320/121; 320/130; 320/139; 320/142; 320/106
(58) Field of Search ................................ 320/117, 116, 320/121, 130, 142, 106; 307/71, 63

(56) References Cited

U.S. PATENT DOCUMENTS 5,563,496 A 10/1996 McClure ...................... 320/48
5,903,764 A * 5/1999 Shyr et al. .................. 713/300

OTHER PUBLICATIONS

Panasonic, Lithium Ion Batteries, Jan. 2000, 7 pages.

* cited by examiner

Primary Examiner—Lawrence Luk
(74) Attorney, Agent, or Firm—Carstens, Yee & Cahoon, LLP

(57) ABSTRACT

A battery charger method and apparatus are disclosed for providing detailed battery status and charging method information for a selected one of multiple batteries that are simultaneously coupled to the battery charger. The battery charger includes a controller. The controller selects one of the batteries to monitor and charge. The controller then starts a measurement cycle for the selected battery. During the measurement cycle, the controller determines current battery characteristics of the selected battery. The controller determines whether the selected battery is ready for charging by determining whether the battery characteristics of the selected battery are within a specified range. If the controller determines that the selected battery is ready for charging, the controller causes the battery charger to start charging the battery. If the controller determines that the selected battery is not ready for charging, the controller selects another battery to monitor and charge. Detailed information about the selected battery may be provided from the controller to a processor that is external to the controller.

27 Claims, 4 Drawing Sheets

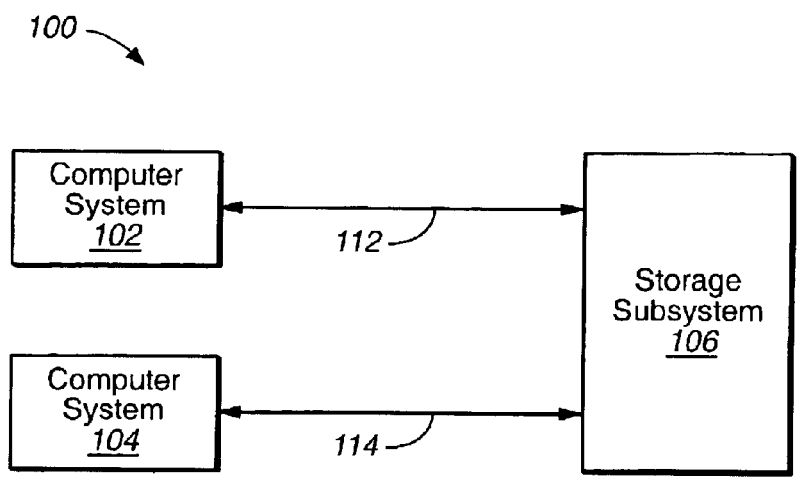
FIG._1
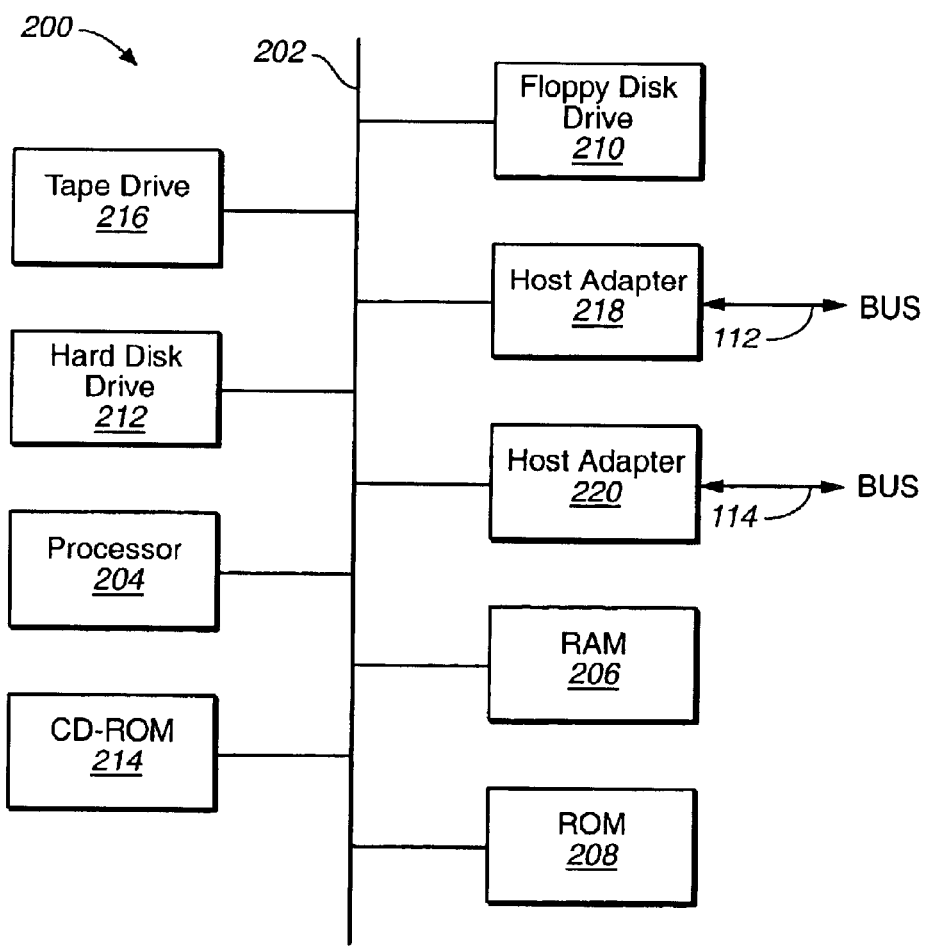
FIG._2

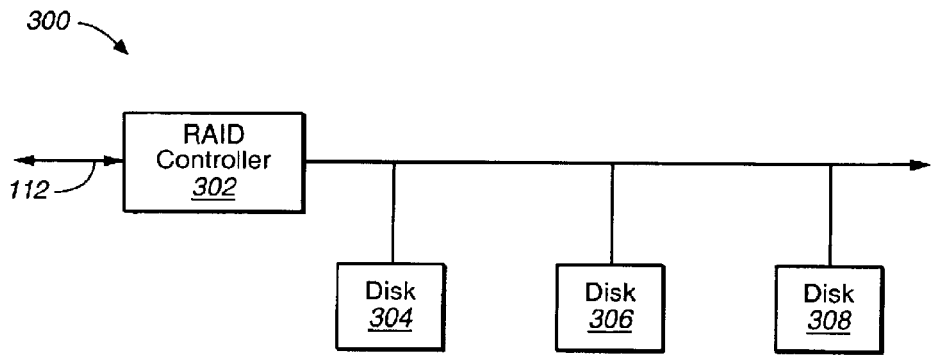
FIG._3
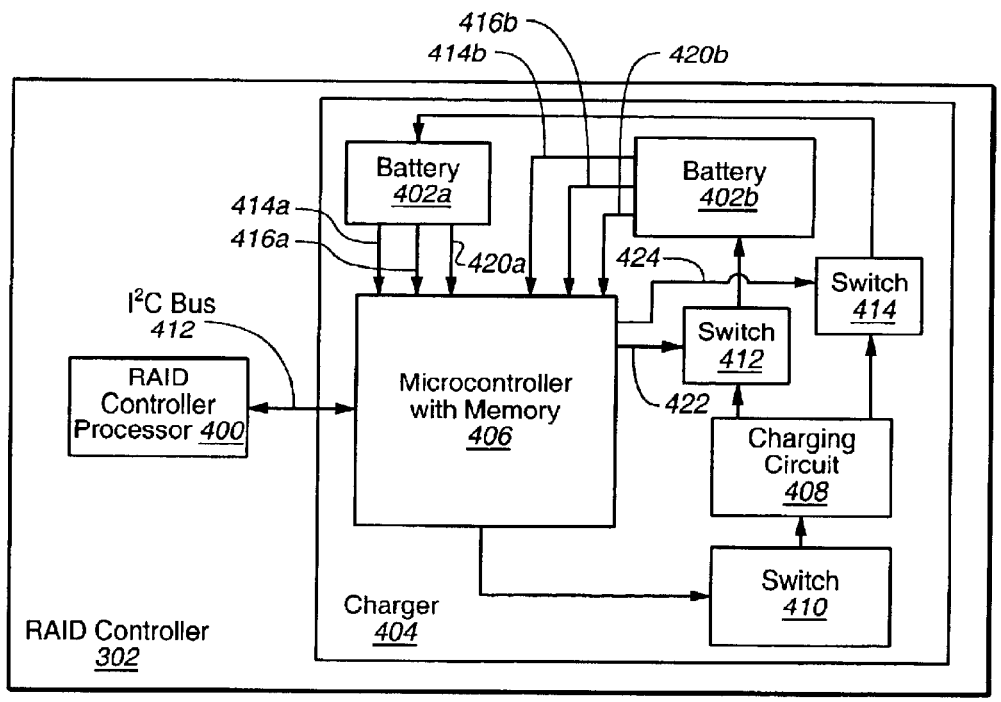
FIG._4

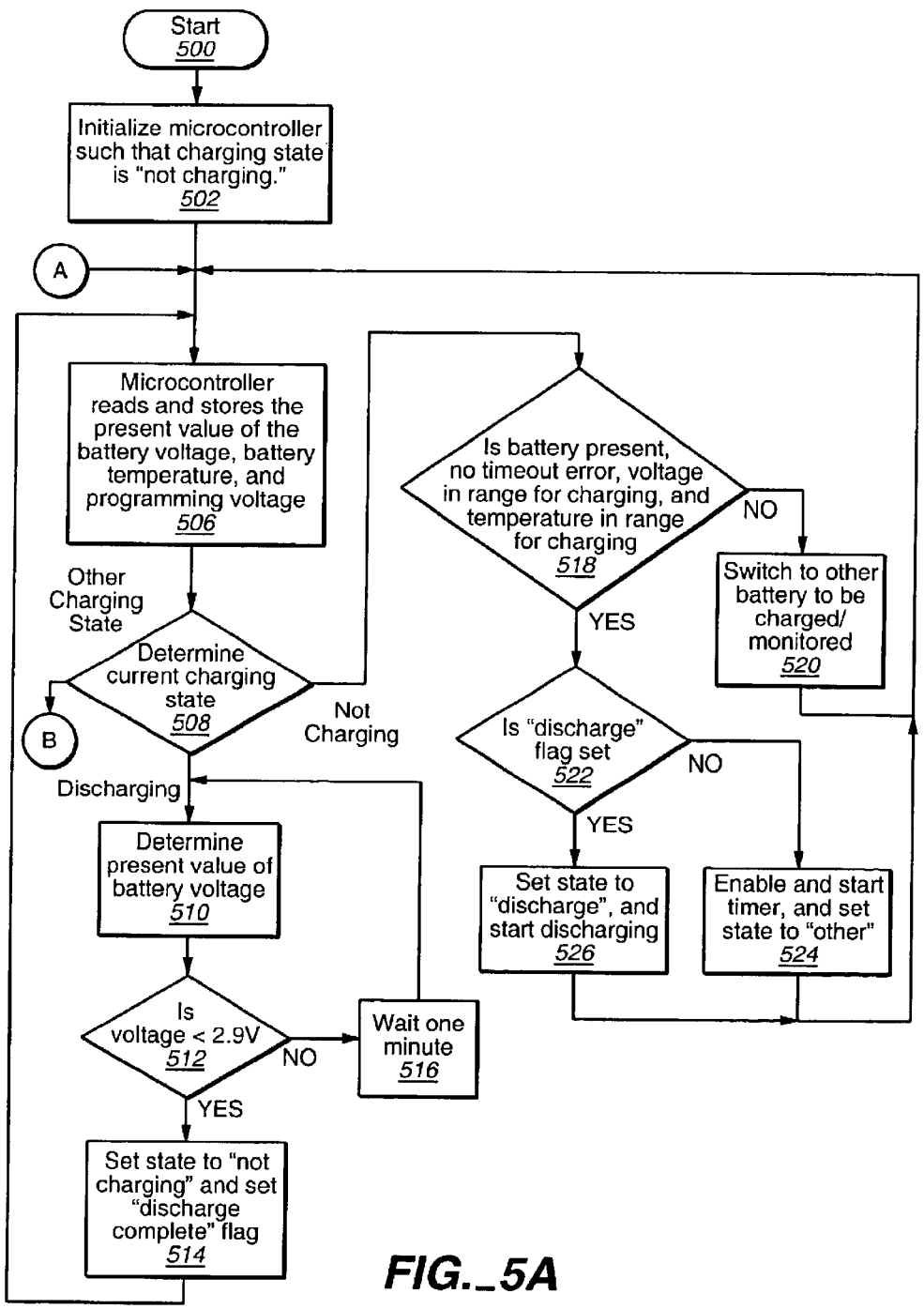
FIG._5A

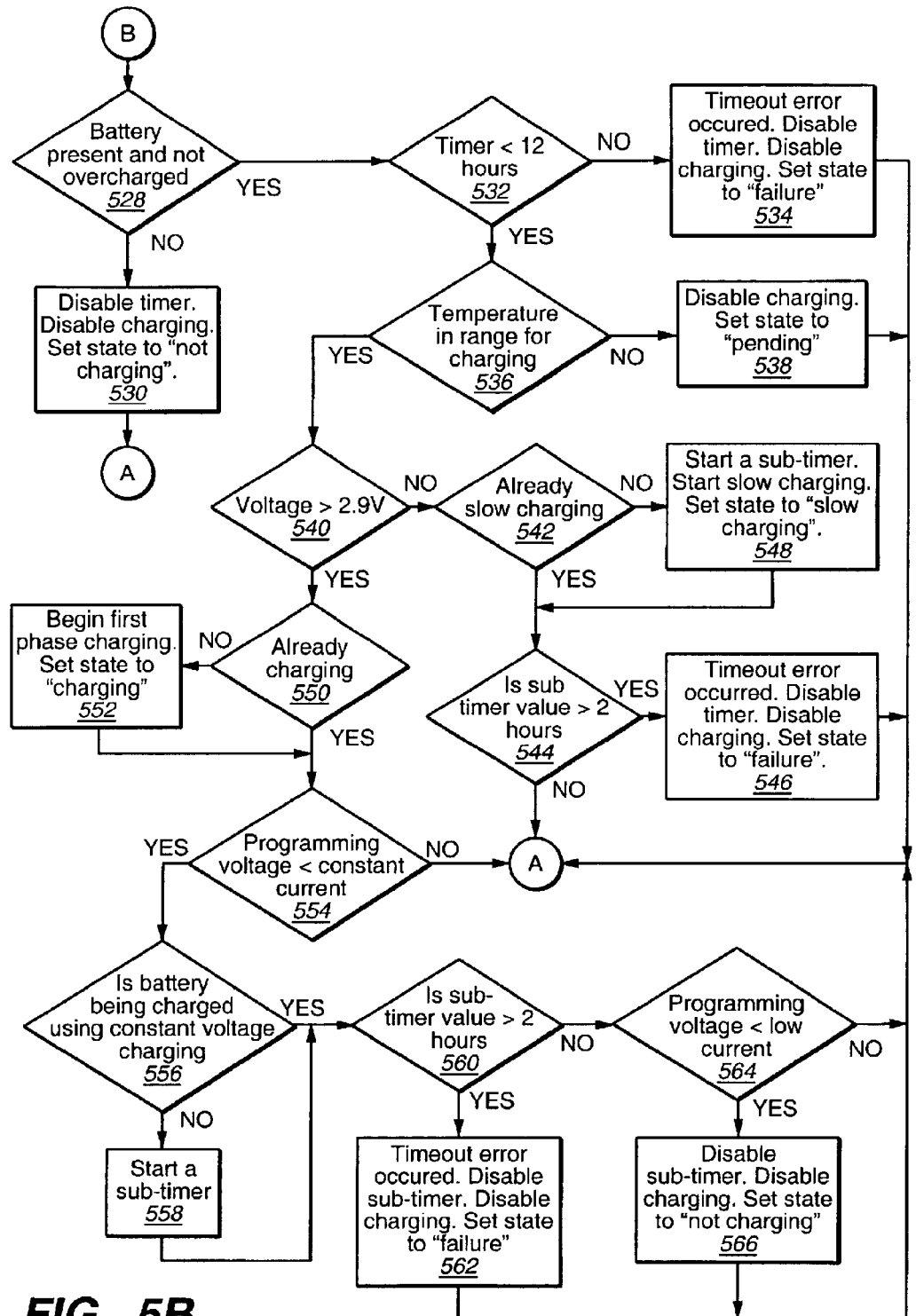
FIG._5B

BATTERY CHARGER SYSTEM AND METHOD FOR PROVIDING DETAILED BATTERY STATUS AND CHARGING METHOD INFORMATION ABOUT MULTIPLE BATTERIES

CROSS REFERENCE TO RELATED APPLICATIONS

The subject matter of the present invention is related to copending United States Application, attorney docket number 02-4360, Ser. No. 10/224,020, titled "Battery Charger System and Method for Providing Detailed Battery Status and Charging Method Information", filed on the same date herewith, assigned to the same assignee, and incorporated herein by reference.

REFERENCE TO A COMPUTER PROGRAM LISTING APPENDIX

A computer program listing appendix is filed herewith submitted on a single compact disk and a duplicate copy of the compact disk. The contents of the compact disk, and its duplicate copy, include a single Microsoft Word file entitled, "02-0511 Battery Charger System and Method for Providing Detailed Battery Status and Charging Method Information About Multiple Batteries", created on Aug. 19, 2002, which is 68 KB in size. The contents of this appendix, which are included on the compact disk, are incorporated herein by reference.

BACKGROUND OF THE INVENTION

1. Technical Field

The present invention relates generally to data processing systems including rechargeable batteries, and more particularly to a battery charger system and method for providing detailed battery status and charging method information about a selected one of multiple batteries that are coupled to the battery charger.

2. Description of the Related Art

Rechargeable batteries are found in many different types of devices. Cellular telephones, laptop computer systems, and many other types of devices include such batteries. Storage controllers that are a part of a storage system also typically include a rechargeable battery. Host computer systems often connect to one or more storage controllers that provide access to an array of storage devices. In a common storage controller, microprocessors communicate the data between the storage array and the host computer system.

These batteries need to be routinely charged. Battery chargers are often provided as either internal or external devices to be used to recharge these batteries. For example, a storage controller may include a battery and a charger as part of the controller card. The prior art chargers typically provide little or no information regarding the battery or the battery's charging status. Because the process of charging a battery is more complicated than merely providing a constant voltage or current to the battery, additional information regarding the battery's characteristics, the current charging state, and historical information about the battery would be useful.

Therefore, a need exists for a battery charger system and method for providing detailed battery status and charging method information about a selected one of multiple batteries that are coupled to the battery charger.

SUMMARY OF THE INVENTION

A battery charger method and apparatus are disclosed for providing detailed battery status and charging method information for a selected one of multiple batteries that are simultaneously coupled to the battery charger. The battery charger includes a controller. The controller selects one of the batteries to monitor and charge. The controller then starts a measurement cycle for the selected battery. During the measurement cycle, the controller determines current battery characteristics of the selected battery. The controller determines whether the selected battery is ready for charging by determining whether the battery characteristics of the selected battery are within a specified range. If the controller determines that the selected battery is ready for charging, the controller causes the battery charger to start charging the battery. If the controller determines that the selected battery is not ready for charging, the controller selects another battery to monitor and charge. Detailed information about the selected battery may be provided from the controller to a processor that is external to the controller.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of a data processing system in accordance with the present invention;

FIG. 2 is a block diagram of a computer system, such as one of the computer systems of FIG. 1, in which the present invention may be implemented;

FIG. 3 is a block diagram of a storage subsystem coupled to a storage controller which includes a battery charger in accordance with the present invention;

FIG. 4 is a block diagram of a storage controller that includes multiple batteries and a battery charger in accordance with the present invention; and FIGS. 5A and 5B together depict a high level flow chart which illustrates a battery charger selecting one of multiple batteries and a measurement cycle of the selected battery in accordance with the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

The present invention is a battery charger system and method for providing detailed battery status information and charging method information about a selected one of multiple batteries. One or more batteries are simultaneously coupled to a battery charger. The battery charger includes a microcontroller that monitors battery characteristics during battery operation and charging. The microcontroller includes a bus interface that may be used to couple the battery charger to an external processor. The microcontroller may provide battery characteristics and charging method information to the external processor through the bus interface.

The controller within the battery charger will start a measurement cycle of a selected battery. When the battery measurement cycle is started, the battery voltage, temperature, and programming voltage will be measured and stored within the controller. If the controller determines that the battery is ready for charging, the controller will begin monitoring the battery and control the charging of the battery. If the controller determines that the battery is not ready for charging, the controller will select another battery to be monitored and charged. Detailed status information and charging method information are maintained about the selected battery by the controller within the battery charger while the battery is being monitored and/or charged. This status information includes an indication of the current state of the battery as well as information about the charging method being used.

All of this state information is maintained, along with other battery characteristic and charging method information, within the microcontroller. The battery characteristic and charging method information may be accessed by a processor or system that is external to the battery charger through a bus interface provided by the microcontroller. In addition, battery voltage, battery temperature, programming voltage, battery current, timer values, subtimer values, status registers, and flags are maintained and can be accessed by an external processor.

The battery charger, through the controller, is capable of determining a current charging method being used to charge a selected battery. The battery charger is also capable of determining whether the current charging method is appropriate, and changing the current charging method such that the appropriate charging method is used to charge the selected battery. In this manner, the battery charger itself is capable of selecting one of multiple batteries to be monitored and charged, determine the current battery characteristics and charging method, and change the charging method such that an appropriate charging method is used. The controller may then select a different battery and repeat the process so that all of the batteries remain properly charged. Detailed information about all of the batteries may be obtained from the controller by a processor that is external to the battery charger.

Although the present invention is described below as being part of a storage controller, the present invention may be utilized in any type of device which includes a battery and battery charger.

With reference now to the figures, and in particular with reference to FIG. 1, a data processing system 100 is depicted according to the present invention. Data processing system 100 includes computer systems 102 and 104, which are connected to storage subsystem 106. In the depicted example, storage subsystem 106 is a disk drive storage subsystem. Computer systems 102 and 104 are connected to storage subsystem 106 by bus 112 and bus 114. According to the present invention, bus 112 and bus 114 may be implemented using a number of different bus architectures, such as a small computer system interface (SCSI) bus or a fibre channel bus.

Turning now to FIG. 2, a block diagram of a computer system 200, such as computer system 102 or 104 in FIG. 1, is illustrated in which the present invention may be implemented. Computer system 200 includes a system bus 202 connected to a processor 204 and a memory 206. Computer system 200 also includes a read only memory (ROM) 208, which may store programs and data, such as, for example, a basic input/output system that provides transparent communications between different input/output (I/O) devices. In the depicted example, computer system 200 also includes storage devices, such as floppy disk drive 210, hard disk drive 212, CD-ROM 214, and tape drive 216. Computer system 200 sends and receives data to a storage subsystem, such as storage subsystem 106 in FIG. 1, through host adapters 218 and 220, which are connected to buses 112 and 114, respectively. These host adapters provide an interface to send and receive data to and from a storage subsystem in a data processing system.

A storage subsystem is a collection of storage devices managed separately from the primary processing system, such as a personal computer, a work station, or a network server. A storage subsystem includes a controller that manages the storage devices and provides an interface to the primary processing system to provide access to the storage devices within the storage subsystem. A storage system is typically physically separate from the primary processing system and may be located in a remote location, such as in a separate room. These host adapters provide an interface to send and receive data to and from subsystem in a data processing system.

Programs supporting functions within host computer system 200 are executed by processor 204. While any appropriate processor may be used for processor 204, the Pentium microprocessor, which is sold by Intel Corporation and the Power PC 620, available from International Business Machines Corporation and Motorola, Inc. are examples of suitable processors. "Pentium" is a trademark of the Intel Corporation, and "Power PC" is a trademark of International Business Machines Corporation.

Additionally, databases and programs may be found within a storage device, such as hard disk drive 212. Data used by processor 204 and other instructions executed by processor 204 may be found in RAM 206 and ROM 208.

FIG. 3 is a block diagram of a storage subsystem coupled to a storage controller which includes a battery charger in accordance with the present invention. In the depicted example, storage subsystem 300 is a disk drive (i.e., a hard disk drive) system containing a controller 302. FIG. 3 depicts additional detail for only one of the controllers and its associated drives of FIG. 2. Controller 302 is connected to bus 112. This controller controls disk drives 304, 306, and 308.

FIG. 4 is a block diagram of a storage controller that includes two batteries and a battery charger in accordance with the present invention. Storage controller 302 includes a controller processor 400, a battery 402a, battery 402b, and a battery charger 404. Controller processor 400 is coupled to charger 404 utilizing a bus 412. Although bus 412 preferably conforms to the I²C protocol, any suitable bus architecture may be used. Charger 404 may be used to select and then monitor and/or charge either battery 402a or 402b.

Battery 402a and battery 402b are preferably Lithium Ion batteries. However, those skilled in the art will recognize that the present invention may be utilized with any other type of battery that requires a similar method of charging by altering the voltage and temperatures values described below. Battery 402a, 402b are charged utilizing two charging phases. During the first phase of charging, the battery is charged with a constant current until a first voltage is reached. Preferably, the first voltage is 4.2V. Once this voltage is reached, a second charging phase is entered. During the second phase, the first voltage is held constant while the current drops to a predetermined value. A programming voltage is used to set the current during the first phase and monitored to see the current during the second phase. In addition, a third charging phase may be used to charge the battery. This third phase is referred to as "slow charging". The slow charging phase is used when the battery voltage has fallen below a second voltage. Preferably, the second voltage is 2.9V. During slow charging, a small constant current is used to charge the battery. The slow charging phase is continued until the battery voltage has surpassed the second voltage.

Battery charger 404 includes a microcontroller 406, charging circuit 408, switch 410, switch 412, and switch 414. Microcontroller includes a memory, input/output (I/O) ports, status registers, counters, and timers. Microcontroller is coupled to switch 410, which is used by microcontroller 406 to control whether charging circuit 408 is operating to charge one of the batteries. Microcontroller 406 may obtain the current operating characteristics of batteries 402a, 402b such as temperature, voltage, and current. Microcontroller may obtain the temperature of battery 402a using a temperature sensing line 414a, the value of the voltage of battery 402a using a positive contact line 416a, and the value of the current of battery 402a using line 420a. Microcontroller may obtain the temperature of battery 402b using a temperature sensing line 414b, the value of the voltage of battery 402b using a positive contact line 416b, and the value of the current of battery 402b using line 420b. Microcontroller 406 utilizes the voltage and temperature to determine an appropriate charging state for either battery 402a, 402b and to control the charging of battery 402a, 402b as described in more detail below.

Microcontroller 406 controls which battery is coupled to charging circuit 408 using switch 412 and switch 414. Thus, microcontroller 406 can permit charging and can monitor battery 402a using switch 414. And, microcontroller 406 can permit charging and can monitor battery 402b using switch 416.

Microcontroller 406 includes status registers in which to store all of the battery characteristics which include the state and status information, timer values, voltage values, current values, counter values, table values, the state of flags, and temperature values. These status registers may be accessed by controller processor 400. Microcontroller 406 uses a first timer to time the amount of time the battery had been in the first charging phase. Microcontroller 406 also uses a subtimer to time either the amount of time the battery had been in the second charging phase, or the amount of time the battery had been in the third charging phase.

FIGS. 5A and 5B together depict a high level flow chart which illustrates a battery charger selecting one of multiple batteries and a measurement cycle of the selected battery in accordance with the present invention. The process depicted by FIGS. 5A and 5B is executed by microcontroller 406. The process starts as depicted by block 500 and thereafter passes to block 502 which illustrates initializing the microcontroller. When the microcontroller is initialized, the status is set to "complete" and the state is set to "not charging". The process then passes to block 506 which illustrates the microcontroller reading and storing the present value of the battery voltage, battery temperature, and programming voltage.

Block 508 then depicts a determination of the current charging state of the battery. The battery may be in a charging state, not charging state, discharging state, slow charging state, pending state, or failure state. The "other" state includes any of the following states: charging, slow charging, pending, or failure. The charger state indicates the current charging method being used to charge the selected battery. If a determination is made that the current charging state is "discharging", the process passes to block 510 which illustrates a determination of the present value of the battery voltage. Next, block 512 depicts a determination of whether or not the battery voltage is less than 2.9V. If a determination is made that the battery voltage is not less than 2.9V, the battery has not been fully discharged and the process passes to block 514 which illustrates the microcontroller waiting one minute. The process then passes back to block 510. Referring again to block 512, if a determination is made that the battery voltage is less than 2.9V, the battery has been fully discharged and the process passes to block 514 which depicts the microcontroller setting the state to "not charging". The microcontroller also sets a "discharge complete" flag to indicate that the battery has been fully discharged. The process then passes to block 506.

Referring again to block 508, if a determination is made that the current battery state is "not charging", the process passes to block 518 which illustrates a determination of whether or not the battery is present, there has been no timeout error, the battery voltage is in range for charging, and the battery temperature is in range for charging. When all of these conditions are true, the battery is ready to be charged. If a determination is made that one or more of these conditions are not true, the battery is not ready for charging and the process passes to block 520 which depicts the microcontroller using either switch 412 or 414 to switch to the other battery. The process then passes to block 504.

Referring again to block 518, if a determination is made that all of the conditions are true, the battery is ready for charging and the process passes to block 522 which illustrates a determination of whether or not the discharge flag is set. A discharge flag may be set by controller processor 400 to indicate that the selected battery needs to be discharged. If a determination is made that the discharge flag is not set, the process passes to block 524 which depicts enabling and setting a first timer. The battery state is set to "other". The process then passes back to block 504. Referring again to block 522, if a determination is made that the discharge flag is set, the process passes to block 526 which illustrates setting the battery state to "discharge", and starting discharging the battery. The process then passes to block 504.

Referring again to block 508, if a determination is made that the battery is currently in an "other" state, the process passes to block 528 as depicted through connector B. Block 528 illustrates a determination of whether or not a battery is present and not overcharged. If a determination is made that either no battery is present, or the battery is overcharged, the process passes to block 530 which depicts the microcontroller disabling the first timer, disabling charging, and setting the battery state to "not charging". The process then passes back to block 504.

Referring again to block 528, if a determination is made that a battery is present and the battery is not overcharged, the process passes to block 532 which depicts a determination of whether or not the first timer has an elapsed time of less than 12 hours. If a determination is made that the first timer has an elapsed time that is not less than 12 hours, the battery has been charging too long and the process passes to block 534. Block 534 illustrates a timeout error having occurred. The first timer is disabled and reset. Charging is disabled, and the state is set to "failure". The process then passes back to block 504.

Referring again to block 532, if a determination is made that the first timer does indicate an elapsed time that is less than 12 hours, the process passes to block 536 which depicts a determination of whether or not the battery temperature is in range for charging. If a determination is made that the battery temperature is not in range for changing, e.g. the battery is either too hot or too cold, the process passes to block 538 which illustrates disabling charging, and setting the battery state to "pending". The process then passes back to block 504.

Referring again to block 536, if a determination is made that the battery temperature is in range for changing, the process passes to block 540 which illustrates a determination of whether or not the battery voltage is greater than 2.9V. If a determination is made that the battery voltage is not greater than 2.9V, the battery needs to be slow charged and the process passes to block 542 which depicts a determination of whether or not the battery is already being slow charged. If a determination is made that the battery is already being slow charged, the process passes to block 544 which illustrates a determination of whether or not a sub-timer value is greater than 2 hours. The battery should not be slow charged for more than 2 hours. Therefore, if a determination is made that the value of the sub-timer is not greater than 2 hours, the process passes back to block 504. Referring again to block 544, if a determination is made that the value of the sub-timer is greater than 2 hours, the process passes to block 546 which depicts a timeout error having occurred. The sub-timer is disabled and reset. The state is set to "failure". The process then passes back to block 504.

Referring again to block 542, if a determination is made that the battery is not already being slow charged, the process passes to block 548 which illustrates starting a sub-timer. Slow charging is started, and the battery state is set to "slow charging". The process then passes back to block 504.

Referring again to block 540, if a determination is made that the battery voltage is greater than 2.9V, the process passes to block 550 which illustrates a determination of whether or not the battery is already being charged. If a determination is made that the battery is not already being charged, the process passes to block 552 which depicts beginning a first charging phase. The battery state is set to "charging". The process then passes to block 554 which illustrates a determination of whether the programming voltage is less than the constant current. The programming voltage is less than the constant current when the battery has finished the first charging phase. If a determination is made that the programming voltage is not less than the constant current then the first charging phase has not finished and the process passes to block 504.

Referring again to block 554, if a determination is made that the programming voltage is less than the constant current, the first charging phase has finished and the process passes to block 556. Block 556 depicts a determination of whether or not the battery is presently being charged using constant voltage charging, i.e. second phase charging. If a determination is made that the battery is not being charged using the second charging phase, the process passes to block 558 which illustrates starting a sub-timer. The process then passes to block 560.

Referring again to block 556, if a determination is made that the battery is being charged using the second charging phase, the process passes to block 560 which illustrates a determination of whether or not the sub-timer value is greater than 2 hours. If a determination is made that the value of the sub-timer is greater than 2 hours, the process passes to block 562 which depicts a timeout error having occurred. The sub-timer is then disabled and reset. Charging is disabled and stopped. The state is set to "failure". The process then passes back to block 504.

Referring again to block 560, if a determination is made that the value of the sub-timer is not greater than 2 hours, the process passes to block 564 which depicts a determination of whether or not the programming voltage is less than a low current value. The programming voltage will be less than the low current value when the battery has completed charging. If a determination is made that the programming voltage is not less than the low current value, the process passes to block 504 so that charging can continue. Referring again to block 564, if the programming voltage is less than the low current value, the battery has completed charging and the process passes to block 566 which illustrates disabling and resetting the sub-timer. Charging is disabled and stopped. The state is set to "not charging". The process then passes to block 504.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a battery charger for charging one of a plurality of batteries, said method comprising the steps of:

providing a controller within said battery charger, said controller being simultaneously coupled to said plurality of batteries;

selecting one of said plurality of batteries;

starting, utilizing said controller, a measurement cycle of said one of said plurality of batteries;

during said measurement cycle, determining current battery characteristics of said one of said plurality of batteries utilizing said controller;

determining, utilizing said controller, whether said one of said plurality of batteries is ready for charging by determining whether said current battery characteristics of said one of said plurality of batteries are within a specified range;

determining a current charging state of said one of said plurality of batteries utilizing said controller;

utilizing, by said controller, said battery characteristics and said current charging state to determine an appropriate charging method for said one of said plurality of batteries;

causing, utilizing said controller, said battery charger to charge said one of said plurality of batteries utilizing said appropriate charging method;

wherein the step of determining a current charging state of said one of said plurality of batteries utilizing said controller further comprises the step of determining, utilizing said controller, whether said one of said plurality of batteries is currently not being charged;

determining, by said controller, whether a first flag in said controller is set, said first flag being set when said one of said plurality of batteries is to be discharged; and in response to a determination that said first flag is set, causing, utilizing said controller, said battery charger to discharge said one of said plurality of batteries.

2. The method according to claim 1, further comprising the steps of:

in response to a determination that said one of said plurality of batteries is ready for charging, causing, utilizing said controller, said battery charger to charge said one of said plurality of batteries.

3. The method according to claim 1, further comprising the steps of:

in response to a determination that said one of said plurality of batteries is not ready for charging, selecting, utilizing said controller, a different one of said plurality of batteries; and starting, utilizing said controller, a measurement cycle of said different one of said plurality of batteries.

4. The method according to claim 3, further comprising the steps of:

during said measurement cycle, determining current battery characteristics of said different one of said plurality of batteries utilizing said controller; and determining, utilizing said controller, whether said different one of said plurality of batteries is ready for charging by determining whether said current battery characteristics of said different one of said plurality of batteries are within a specified range.

5. The method according to claim 1, further comprising the steps of:

coupling said controller to a processor that is external to said battery charger; and providing battery information to said processor from said controller, said battery information including said battery characteristics and charging method information.

6. The method according to claim 1, wherein the step of determining a current charging state of said one of said plurality of batteries utilizing said controller further comprises the step of determining, utilizing said controller, whether said one of said plurality of batteries is currently being discharged.

7. The method according to claim 6, further comprising the steps of:

in response to a determination that said one of said plurality of batteries is currently being discharged, determining, utilizing said controller, whether said one or said plurality of batteries is fully discharged; and in response to a determination that said one of said plurality of batteries is fully discharged, setting a second flag within said controller that said one of said plurality of batteries is fully discharged.

8. The method according to claim 1, further comprising the step of:

setting, by a processor that is external to said battery charger, said first flag when said one of said plurality of batteries is to be discharged.

9. The method according to claim 1, wherein the step of determining a current charging state of said one or said plurality of batteries utilizing said controller further comprises the step of determining, utilizing said controller, whether said one of said plurality of batteries is in a state that is other than a discharging state or a not charging state.

10. A method in a battery charger for charging one of a plurality of batteries, said method comprising the steps of:

providing a controller within said battery charger, said controller being simultaneously coupled to said plurality of batteries;

selecting one of said plurality of batteries;

starting, utilizing said controller, a measurement cycle of said one of said plurality of batteries;

during said measurement cycle, determining current battery characteristics of said one of said plurality of batteries utilizing said controller;

determining, utilizing said controller, whether said one of said plurality of batteries is ready for charging by determining whether said current battery characteristics of said one of said plurality of batteries are within a specified range;

wherein the step of determining whether said current battery characteristics of said one of said plurality of batteries are within a specified range further comprises the steps of:

determining whether a temperature of said one of said plurality of batteries is within a particular range;

determining whether said one of said plurality of batteries is overcharged;

determining temperature of said batteries within a particular;

determining whether said one of said plurality of batteries is over discharged; and determining whether said one of said plurality of batteries is already being charged utilizing a first charging phase with flag control wherein said one of said plurality of batteries should be first charged using a first charging phase with flag control and is then charged using a second charging phase with flag control.

11. The method according to claim 10, further comprising the step of:

in response to a determination that said one of said plurality of batteries is over discharged, causing, utilizing said controller, said battery charger to begin slow charging said one of said plurality of batteries.

12. The method according to claim 11, further comprising the step of:

starting a sub-timer within said controller to time a length of time said one of said plurality of batteries is slow charged.

13. The method according to claim 10, further comprising the steps of:

in response to a determination that said one of said plurality of batteries is not already being charged utilizing a first charging phase, causing, utilizing said controller, said battery charger to start charging said one of said plurality of batteries utilizing a first charging phase;

charging said one of said plurality of batteries utilizing a constant current until a second voltage threshold is reached during said first charging phase in response to said second voltage threshold being reached during said first charging phase, causing, utilizing said controller, said battery charger to start charging said one of said plurality of batteries utilizing a second charging phase; and charging said one of said plurality of batteries by holding a voltage of said one of said plurality of batteries constant until a current of said one of said plurality of batteries drops to a current threshold during said second charging phase.

14. The method according to claim 13, further comprising the steps of:

starting a sub-time within said controller to time a length of time said one of said plurality of batteries is charged utilizing said second charging phase.

15. A battery charger for charging one of a plurality of batteries, comprising:

a controller within said battery charger, said controller being simultaneously coupled to said plurality of batteries;

a switch for selecting one of said plurality of batteries;

said controller for starting a measurement cycle of said one of said plurality of batteries;

said controller for determining current battery characteristics of said one of said plurality batteries during said measurement cycle;

said controller for determining whether said one of said plurality of batteries is ready for charging by determining whether said current battery characteristics of said one of said plurality of batteries are within a specified range;

said controller for determining a current charging state of said one of said plurality of batteries;

said controller for utilizing said battery characteristics and said current charging state to determine an appropriate charging method for said one of said plurality of batteries;

said controller for causing said battery charger to charge said one of said plurality of batteries utilizing said appropriate charging method;

said controller for determining whether said one of said plurality of batteries is currently being discharged;

said controller for determining whether a first flag in said controller is set, said first flag being set when said one of said plurality of batteriesis to be discharged; and in response to a determination that said first flag is set, said controller for causing said battery charger to discharge said one of said plurality of batteries.

16. The charger according to claim 15, further comprising:

in response to a determination that said one of said plurality of batteries is ready for charging, said controller for causing said battery charger to charge said one of said plurality of batteries.

17. The charger according to claim 15, further comprising:

in response to a determination that said one of said plurality of batteries is not ready for charging, said controller for selecting a different one of said plurality of batteries; and said controller for starting a measurement cycle of said different one of said plurality of batteries.

18. The charger according to claim 17, further comprising:

said controller for determining current battery characteristics of said different one of said plurality of batteries during said measurement cycle; and said controller for determining whether said different one of said plurality of batteries is ready for charging by determining whether said current battery characteristics of said different one of said plurality of batteries are within a specified range.

19. The charger according to claim 15, further comprising:

said controller being coupled to a processor that is external to said battery charger; and said controller for providing battery information to said processor, said battery information including said battery characteristics and charging method information.

20. The charger according to claim 15, further comprising:

in response to a determination that said one of said plurality of batteries is currently being discharged, said controller for determining whether said one of said plurality of batteries fully discharged; and in response to a determination that said one of said plurality of batteries is fully discharged, a second flag within said controller that indicates that said one of said plurality of batteries is fully discharged when said second flag is set.

21. The charger according to claim 15, further comprising:

a processor that is external to said battery charger for setting said first flag when said one of said plurality of batteries is to be discharged.

22. The charger according to claim 15, further comprising:

said controller for determining whether said one of said plurality of batteries is in a state that is other than a discharging state or a not charging state.

23. A battery charger for charging one of a plurality of batteries, comprising:

a controller within said battery charger, said controller being simultaneously coupled to said plurality of batteries;

a switch for selecting one of said plurality of batteries;

said controller for starting a measurement cycle of said one of said plurality of batteries;

said controller for determining current battery characteristics of said one of said plurality of batteries during said measurement cycle;

said controller for determining whether said one of said plurality of batteries is ready for charging by determining whether said current battery characteristics of said one of said plurality of batteries are within a specified range;

said controller for determining whether a temperature of said one of said plurality of batteries is within a particular range;

said controller for determining whether said one said plurality of batteries is overcharged;

said controller for determining whether said one of said plurality of batteries is over discharged; and said controller for determining whether said one of said plurality of batteries is already being charged utilizing a first charging phase with flag control, wherein said one of said plurality of batteries should be first charged using a first charging phase with flag control and is then charged using a second charging phase with flag control.

24. The charger according to claim 23, further comprising:
in response to a determination that said one of said plurality of batteries is over discharged, said controller for causing said battery charger to begin slow charging said one of said plurality of batteries.

25. The charger according to claim 24, further comprising:
a sub-timer being started within said controller to time a length of time said one of said plurality of batteries is slow charged.

26. The charger according to claim 23, further comprising:
in response to a determination that said one of said plurality of batteries is not already being charged utilizing a first charging phase, said controller for causing said battery charger to start charging said one of said plurality of batteries utilizing a first charging phase;
said charger for charging said one of said plurality of batteries utilizing a constant current until a second voltage threshold is reached during said first charging phase;
in response to said second voltage threshold being reached during said first charging phase, said controller for causing said battery charger to start charging said one of said plurality of batteries utilizing a second charging phase; and
said charger for charging said one of said plurality of batteries by holding a voltage of said one of said plurality of batteries constant until a current of said one of said plurality of batteries drops to a current threshold during said second charging phase.

27. The charger according to claim 26, further comprising:
a sub-timer being started within said controller to time a length of time said one of said plurality of batteries is charged utilizing said second charging phase.

* * * * *